United States Patent
Abe

(10) Patent No.: US 8,207,751 B2
(45) Date of Patent: Jun. 26, 2012

(54) RECEIVER WHICH RECEIVES VIDEO INFORMATION

(75) Inventor: Shinya Abe, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 191 days.

(21) Appl. No.: 12/726,466

(22) Filed: Mar. 18, 2010

(65) Prior Publication Data

US 2010/0264952 A1    Oct. 21, 2010

(30) Foreign Application Priority Data

Apr. 16, 2009   (JP) ................. 2009-100216

(51) Int. Cl.
| H03K 19/00 | (2006.01) |
| H04N 5/44 | (2011.01) |
| G05B 19/00 | (2006.01) |
| G06F 7/00 | (2006.01) |
| H04B 1/00 | (2006.01) |

(52) U.S. Cl. ............. 326/8; 348/725; 348/553; 340/5.8; 726/11

(58) Field of Classification Search ...... 326/8; 348/725, 348/553; 726/11; 340/5.8
See application file for complete search history.

(56) References Cited

U.S. PATENT DOCUMENTS

| 7,729,618 | B2* | 6/2010 | Tatum et al. ............... | 398/139 |
| 2009/0086089 | A1* | 4/2009 | Matsui et al. .............. | 348/441 |
| 2009/0201421 | A1* | 8/2009 | Mawatari et al. ........... | 348/553 |
| 2009/0222905 | A1* | 9/2009 | Choi et al. ................. | 726/11 |
| 2009/0251605 | A1* | 10/2009 | Hsiao ....................... | 348/554 |
| 2010/0073560 | A1* | 3/2010 | Kitano et al. .............. | 348/554 |
| 2010/0097529 | A1* | 4/2010 | Tokoro ...................... | 348/730 |
| 2010/0141845 | A1* | 6/2010 | Kikkawa et al. ........... | 348/706 |
| 2010/0321479 | A1* | 12/2010 | Yang ......................... | 348/51 |
| 2011/0283129 | A1* | 11/2011 | Guillerm ................... | 713/324 |

FOREIGN PATENT DOCUMENTS

| JP | 2007-108198 | 4/2007 |
| JP | 2008-234046 | 10/2008 |
| JP | 2008-301232 | 12/2008 |

* cited by examiner

Primary Examiner — Shawki S Ismail
Assistant Examiner — Dylan White
(74) Attorney, Agent, or Firm — Turocy & Watson, LLP

(57) ABSTRACT

A semiconductor integrated circuit device includes: an inter-equipment authentication section formed on a chip; a control section formed on the chip being capable of giving instructions to stop the oscillation of the oscillation section; and an oscillation stop canceling section configured to output an oscillation stop canceling signal to restart the oscillation of the oscillation section, based upon whether or not 5 volts of DDC from the source equipment is supplied to an input terminal. The start of the operation of a microcontroller unit on a system on chip is cable of being controlled by the 5 volts of DDC, which are power supply voltage supplied from the source equipment via DDCs, to thereby incorporate a data authentication section and the inter-equipment authentication in an integrated circuit without increasing power consumption.

20 Claims, 3 Drawing Sheets

OPERATE

STOP

| OUTPUT PORT | POLARITY CONTROL SIGNAL | ENABLING CONTROL SIGNAL |
|---|---|---|
| 1 | L | H |
| 2 | L | H |
| 3 | L | H |
| 4 | L | H |
| 5 |   | L |
| 6 | H | H |
| 7 | L | H |
| 8 | H | H |
| 9 |   | L |

| OUTPUT PORT | POLARITY CONTROL SIGNAL | ENABLING CONTROL SIGNAL |
|---|---|---|
| 1 | H | H |
| 2 | H | H |
| 3 | H | H |
| 4 | H | H |
| 5 |   | L |
| 6 | H | H |
| 7 | L | H |
| 8 | H | H |
| 9 |   | L |

RECEIVER WHICH RECEIVES VIDEO INFORMATION

CROSS-REFERENCE TO RELATED APPLICATIONS

This application is based upon and claims the benefit of priority from the prior Japanese Patent Application No. 2009-100216 filed in Japan on Apr. 16, 2009; the entire contents of which are incorporated herein by reference.

BACKGROUND OF THE INVENTION

1. Field of the Invention

The present invention relates to a semiconductor integrated circuit device suitable for a receiver which receives video information by performing inter-equipment authentication.

2. Description of the Related Art

The digitization of video information, audio information and the like (hereinafter referred to as AV information) has hitherto been pushed forward with. Digital broadcasting, such as BS digital television broadcasting and digital terrestrial television broadcasting, has also been started, and digitized AV information (AV data) has come to be broadcast as digital contents. DVD recorders, hard disk recorders, semiconductor memory recorders and the like have also come into widespread use as devices which record such digital AV data.

In digital recording, it is possible to prepare replicates without degrading original AV data and from the viewpoint of the protection of copyrights, the necessity for limiting the copying of digital contents has been increasing. In consideration of such a function of protecting copyrights and transmission for high image quality and of the handling of cables as well, the HDMI (high-definition multimedia interface) has come to be adopted which transmits uncompressed video signals via one cable and also transmits audio signals and control signals. It should be noted that the HDMI is disclosed in Japanese Patent Application Laid-Open Publication No. 2007-108198, for example.

In the HDMI, TMDS (transition minimized differential signaling) is adopted which is a standard for transmission in physical layers. Also, in the HDMI, the DDC (display data channel) is adopted in order to cause source equipment, such as recording apparatus, to automatically recognize various kinds of electrical specifications and the like for displays. In this DDC, two-wire serial transmission of the $I^2C$ (I squared C) bus type is adopted. And the EDID (extended display identification data) standard is adopted as a standard for electrical specifications and the like for the automatic recognition in which this DDC is used.

An HDMI receiver which receives signals from source equipment, such as digital recording apparatus, is provided with an EDID section for inter-equipment authentication in addition to a data authentication section which receives TMDS signals. The EDID section deals with EDID information for checking the performance, function and the like of receiver equipment such as display devices.

In recent years, with the number of pieces of source equipment which produces outputs compatible with HDMI increasing, receiver equipment, such as digital television receivers, provided with a plurality of HDMI ports has become widespread. In such receiver equipment, an EDID section is provided for each HMDI port, thereby enabling EDID information to be transmitted to source equipment corresponding to each HDMI port.

In general, an $E^2$ PROM which stores EDID information is adopted as an EDID section. Therefore, when a plurality of HDMI ports are provided, it is necessary to prepare a plurality of $E^2$ PROMs constituting the EDID section and to provide a changeover switch for selecting one of the plurality of $E^2$ PROMs. In such a system provided with a plurality of $E^2$ PROMs, from the standpoints of the miniaturization of the device, low power consumption and the like, it is advantageous to integrate the plurality of $E^2$ PROMs and to form a plurality of EDID sections corresponding to a plurality of HDMI ports on one LSI. Hence, systems in which a data authentication section and an EDID section are incorporated on an SoC (a system on chip) constituting a digital television receiver have been developed.

However, the EDID section is intended to permit inter-equipment authentication by transmitting EDID information to source equipment via the DDC, and it is necessary that operation be possible during access from the source equipment. For this reason, it is necessary that power be constantly supplied to the EDID section during access from the source equipment irrespective of the operating condition, such as an on condition and an off condition, of the receiver equipment. That is, when the SoC design of the EDID section is adopted, it is necessary that power be constantly supplied to the SoC in order to supply power to the EDID section, and power consumption increases.

BRIEF SUMMARY OF THE INVENTION

A semiconductor integrated circuit device according to an aspect of the present invention comprises: an inter-equipment authentication section formed on a chip and configured to perform inter-equipment authentication between the inter-equipment authentication section itself and source equipment; a control section formed on the chip and configured to control the inter-equipment authentication section, the control section operating when a system clock from an oscillation section is supplied, and being capable of giving instructions to stop the oscillation of the oscillation section; an oscillation stop canceling section configured to output an oscillation stop canceling signal to restart the oscillation of the oscillation section, based upon whether or not 5 volts of DDC from the source equipment is supplied to an input terminal; and an oscillation control section configured to control the oscillation section on the basis of an on or off condition of a main power supply, instructions to stop the oscillation from the control section and the oscillation stop canceling signal from the oscillation stop canceling section.

DETAILED DESCRIPTION OF THE INVENTION

Figure 1:
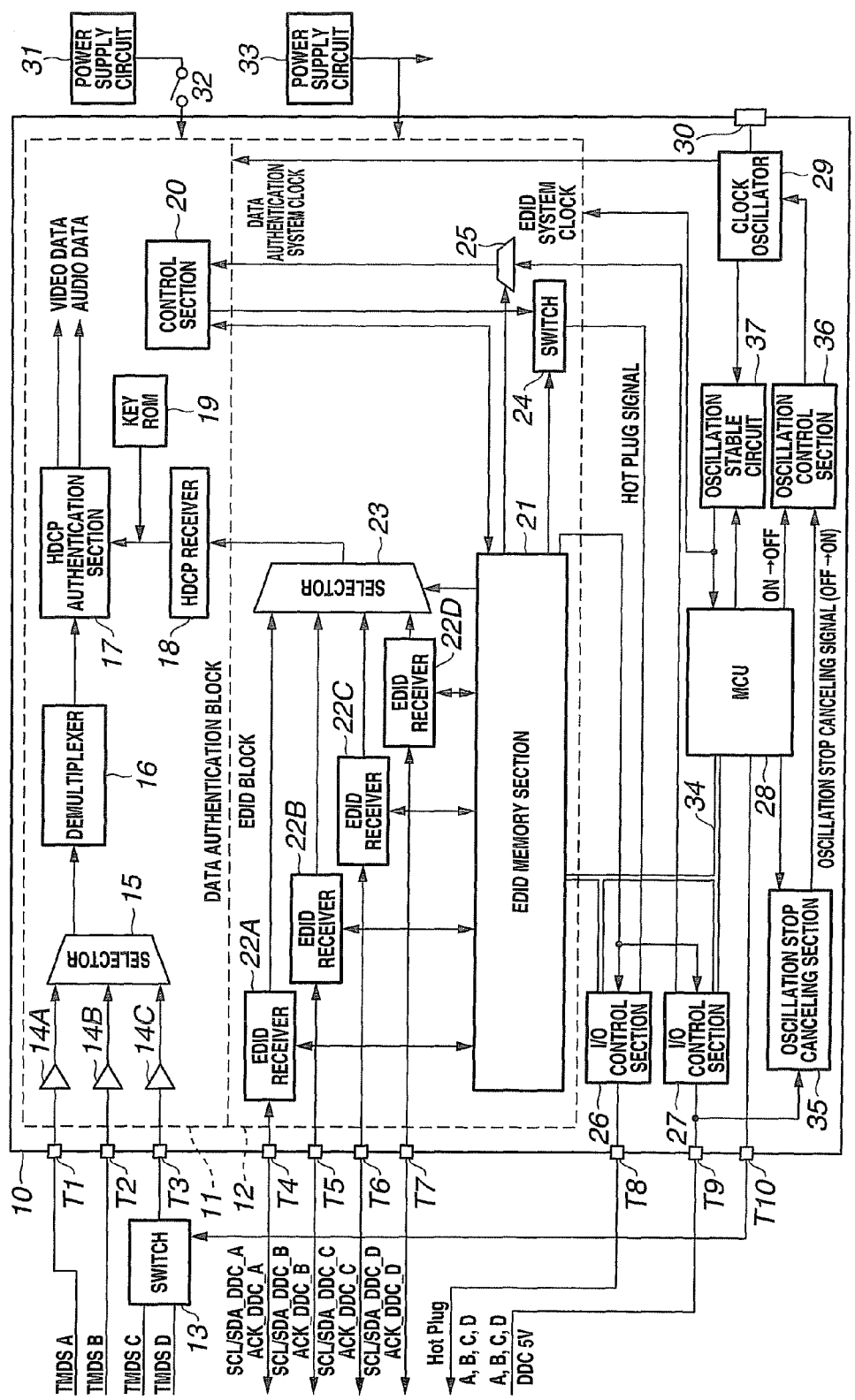
FIG. 1 is a block diagram showing a semiconductor integrated circuit device according to an embodiment of the present invention.

Hereinafter, an embodiment of the present invention will be described in detail with reference to the drawings. FIG. 1 is a block diagram showing a semiconductor integrated circuit device according to an embodiment of the present invention.

The semiconductor integrated circuit device 10 of FIG. 1 shows an SoC (a system on chip) constituting an HDMI receiver. This semiconductor integrated circuit device 10 is compatible with HDMI ports of four channels with TMDS signals of three channels capable of being inputted. Note that, in this embodiment, the number of inputs is not limited to this figure.

The semiconductor integrated circuit device 10 has a data authentication block 11 and an EDID block 12. In this embodiment, as will be described later, power is constantly supplied to the EDID bloc 12, whereas the stop of supply of an EDID system clock to an MCU 28 is made possible, whereby power consumption is reduced.

The data authentication block 11 performs HDCP (high-bandwidth digital content protection system) authentication and outputs video data and audio data based on inputted TMDS signals. The EDID block 12 as an inter-equipment authentication section deals with EDID information, on the basis of which source equipment checks the performance and function of receiver equipment, and is configured to send EDID information to the source equipment and to supply information for HDCP authentication from the source equipment (hereinafter referred to as HDCP authentication information) to the data authentication block 11.

Each portion of the data authentication block 11 is controlled by a control section 20 (not shown). TMDS signals are inputted to physical layer (PHY) sections 14A to 14C via terminals T1 to T3, respectively. By performing the processing of their respective TMDS signals thus inputted, the physical layer sections 14A to 14C convert the TMDS signals, which are differential signals, into digital signals and output the digital signals to a selector 15. The selector 15, to which a channel selection signal is given from the control section 20, selects one of the outputs of the physical layers 14A to 14C on the basis of the channel selection signal, and supplies the output to a demultiplexer 16. The demultiplexer 16 separates video data, audio data and the like from the inputted signal and outputs the video data, audio data and the like to an HDCP authentication section 17.

As will be described later, the HDCP authentication information which has been transmitted via an I²C bus of a channel selected from the four channels of DDC is inputted to an HDCP receiver 18 via a selector 23. The HDCP receiver 18 is configured to output the received HDCP authentication information to the HDCP authentication section 17.

The data inputted from the demultiplexer 16 to the HDCP authentication section 17 has been encrypted by the HDCP. The HDCP authentication section 17 is given the HDCP authentication information for the encrypted data from the HDCP receiver 18. An authentication key for the decoding of the encrypted data is stored in a key ROM 19. The HDCP authentication section 17 performs HDCP authentication by using the HDCP information from the HDCP receiver 18 and the authentication key from the key ROM 19. As a result of this, the HDCP authentication section 17 decodes the encrypted data and outputs the video data and audio data of the selected channel.

In this embodiment, power supply voltage is supplied to the data authentication block 11 from a power supply circuit 31 via a switch 32. The switch 32 is turned on and off according to the on condition and off condition of a main power supply of the system and, for example, when this embodiment is applied to a display device, when display responsive to a TMDS signal from the source equipment connected to an HDMI port is to be performed, the switch 32 is turned on and turns on the power to the data authentication block 11.

Note that a data system clock is supplied from a clock oscillator 29 to each portion in the interior of the data authentication block 11. The output of a crystal oscillator 30 is given to the clock oscillator 29, and the clock oscillator 29 is configured to be able to generate a data authentication system clock and an EDID system clock. Moreover, the clock oscillator 29 is controlled by an oscillation control signal from an oscillation control section 36 as to whether the clock oscillator 29 oscillates an EDID system clock or stops its operation.

The control section 20 is configured to generate and output a hot plug signal used to let source equipment know that HDMI connection is possible.

On the other hand, the EDID block 12 is composed of an EDID memory section 21, EDID receivers 22A to 22D, selectors 23 and 25, and a switch 24. The EDID memory section 21 has a storage region for storing EDID information and can be composed of an SRAM and the like, for example. In the example of FIG. 1, the EDID memory section 21 can store and process four pieces of EDID information corresponding to the HDMI ports of four channels.

Note that, in this case, the difference among the four pieces of EDID information is only physical addresses, and it is possible to adopt such a configuration that for one piece of EDID information and the remaining pieces of EDID information, the EDID memory section 21 stores only address data in which physical addresses, which are differential information on physical addresses, are present and physical address data. In this case, it is possible to reduce the storage capacity necessary in the EDID memory section 21. As a result of this, even when the number of channels of the EDID increases, it is possible to suppress an increase in the storage capacity of the EDID memory section 21 and it becomes relatively easy to increase the number of channels of the EDID in terms of LSI design.

Further, it becomes possible to easily rewrite EDID information according to the function and performance of receiver equipment by composing the EDID memory section 21 of an SRAM.

The EDID information to be transmitted from the EDID memory section 21 to source equipment is transmitted by an I²C bus of DDC. In FIG. 1, I²C buses of four channels, which are channels A to D, are provided, and each of the I²C buses can be connected to one of four pieces of source equipment, which are not shown in the figure. Each of the I²C buses of the channels A to D transmits SCL (serial lock), SDA (serial data), ACK (acknowledge) of DDC (SCL/SDA/ACK_DDC_A to D), respectively.

The EDID receivers 22A to 22D are connected to the I²C bus of each channel via terminals T4 to T7, respectively, and are configured to be able to supply the EDID information from the EDID memory section 21 to the source equipment connected via the I²C buses in response to a request for EDID information read from the source equipment.

Each of the EDID receivers 22A to 22D receives HDCP authentication information from the source equipment and can supply the HDCP authentication information to the selector 23. The selector 23 is given a channel selection signal from the control section 20 and selects an I²C bus to be connected to the HDCP receiver 18. The HDCP authentication information from the source equipment corresponding to the channel selection signal is given by the selector 23 to the HDCP receiver 18.

Because in this embodiment the EDID block 12 is incorporated in the semiconductor integrated circuit device 10, it is impossible to use the 5 volts of DDC supplied via the DDCs as the power supply. In this embodiment, power supply voltage is supplied to the EDID block 12 from a power supply circuit 33. The power supply circuit 33 is configured to constantly generate power supply voltage and to supply the power supply voltage to EDID block 12 irrespective of the operating condition of the data authentication block 11. It should be noted that an EDID system clock is supplied to the EDID block 12 from a clock oscillator 29, which will be described later, whereby each portion of the EDID block 12 operates.

Further, the power supply circuit 33 is configured to be able to supply power supply voltage also to portions other than the data authentication block 11 and the EDID block 12.

As described above, in this embodiment, the provision of the power supply circuits 31 and 32 enables power supply voltage to be supplied to the data authentication block 11 and the EDID block 12 independently of each other. As a result of this, even when the power supply of the data authentication block 11 is in an off condition, it is possible to turn on the power supply of the EDID block 12 and in the case of access from source equipment, it is possible to surely perform the sending and receiving of EDID information between the EDID block 12 and the source equipment.

Furthermore, in this embodiment, when no access is made from the source equipment to the EDID block 12, it is possible to suppress the power consumption of the EDID block 12 by stopping the supply of an EDID system clock.

In this embodiment, the stop of the supply of an EDID system clock is controlled by an MCU (a microcontroller unit) 28. The MCU 28 is configured to be able to stop the operation of the EDID block 12 and of the MCU 28 itself by stopping the supply of an EDID system clock. For example, when the main power supply of the system is turned off or when the MCU 28 judges that the operation of the MCU 28 itself is unnecessary, the MCU 28 outputs an oscillation stop signal for stopping the oscillation of an EDID system clock to an oscillation control section 36. For example, when the main power supply is turned on, the oscillation control section 36 outputs an oscillation control signal for starting the oscillation of the clock oscillator 29, and when an oscillation stop signal from the MCU 28 is inputted, the oscillation control section 36 outputs an oscillation control signal for stopping the oscillation of an EDID system clock of the clock oscillator 29 to the clock oscillator 29.

On the other hand, the start of the supply of an EDID system clock can be executed not only by turning on the main power supply, but also by using the 5 volts of DDC transmitted by the DDC as a trigger. The MCU 28 restarts its operation through the supplying of an EDID system clock. That is, in this embodiment, the operation of the MCU 28 is restarted by using the 5 volts of DDC transmitted by the DDC as a trigger.

The 5 volts of DDC of four channels, which are the channels A to D, is supplied to an I/O control section 27 via a terminal T9 of the semiconductor integrated circuit device 10 and is supplied also to the oscillation stop canceling section 35. By detecting the transmission of the 5 volts of DDC, the oscillation stop canceling section 35 determines whether or not access is made from source equipment to the EDID block 12. Upon detecting the 5 volts of DDC, the oscillation stop canceling section 35 outputs an oscillation stop canceling signal for canceling the stop of oscillation to the oscillation control section 36. Upon detecting that the oscillation stop canceling signal makes a transition from an inactive condition to an active condition, the oscillation control section 36 cancels the stop of oscillation of an EDID system clock of the clock oscillator 29 and outputs an oscillation control signal for causing oscillation to the clock oscillator 29. That is, the oscillation of an EDID system clock and the stop thereof are controlled by the MCU 28 and the oscillation stop canceling section 35.

Figure 2:
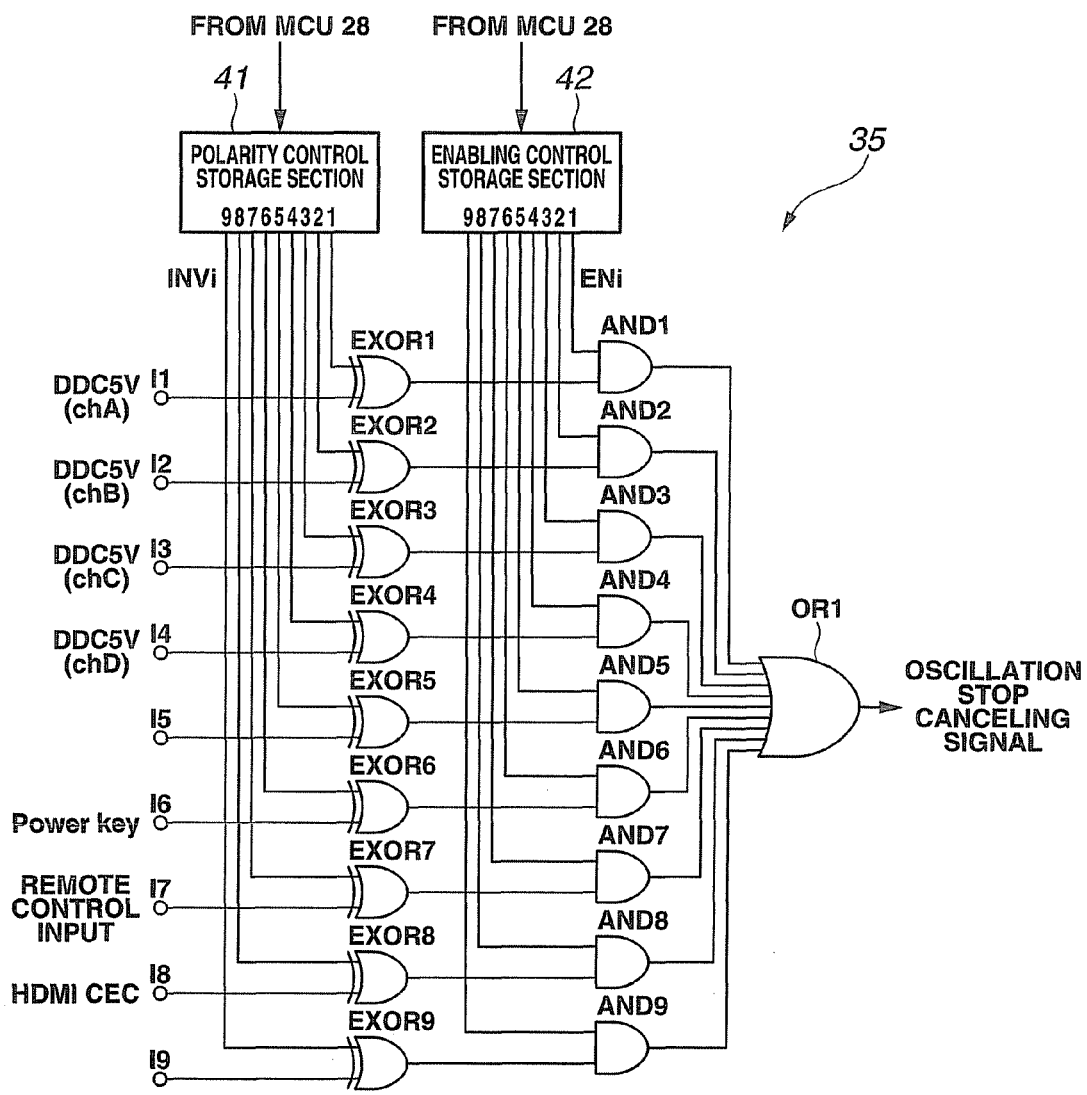
FIG. 2 is a circuit diagram showing the concrete configuration of an oscillation stop canceling section 35.

FIG. 2 is a circuit diagram showing the concrete configuration of the oscillation stop canceling section 35.

In FIG. 2, not only the 5 volts of DDC of four channels, which are the channels A to D, but also power key signals, inputs by remote control, HDMI-CEC (high-definition multimedia interface-consumer electronics control) and the like, which are not shown in FIG. 1, are inputted the oscillation stop canceling section 35.

The oscillation stop canceling section 35 of FIG. 2 accepts nine inputs, and can generate an oscillation stop canceling signal for restarting the MCU 28 by use of any signal of the nine inputs supplied to input terminals I1 to I9. Note that, in the example of FIG. 2, the oscillation of an EDID system clock is restarted when the oscillation stop canceling signal makes a transition from a low level (hereinafter referred to as L-level) to a high level (hereinafter referred to as H-level).

Oscillation enabling signals ENi indicating which of the nine inputs is used (the symbol i indicates integers of 1 to 9) are stored in an enabling control storage section 42. For example, when input signals are not supplied to the input terminal I1 and I9 as in the example of FIG. 2, oscillation enabling signals EN5 and EN9 of L-level and oscillation enabling signals EN1 to EN4 and EN6 to EN8 of H-level are stored in the enabling control storage section 42. The oscillation enabling signals EN1 to EN9 are supplied to AND gates AND1 to AND9, respectively. As a result of this, the level of outputs of the AND gates to which oscillation enabling signals ENi of L-level among the AND gates AND1 to AND9 becomes L-level.

Outputs of EXCLUSIVE-OR circuits EXOR1 to EXOR9 are given to other-side input terminals of the AND gates AND1 to AND9, respectively. In the EXCLUSIVE-OR circuits EXOR1 to EXOR9, signals to be inputted to the input terminals I1 to I9 are supplied to the one-side input terminals thereof and polarity control signals INV1 to INV9 from a polarity control storage section 41 are supplied to the other-side input terminals thereof.

Signals to be inputted to the input terminals include not only high-active signals, but also low-active signals. The polarity control storage section 41 is configured to store polarity reversal signals INVi of L-level when signals inputted to the input terminals Ii are high-active signals and to store polarity reversal signals INVi of H-level when signals inputted to the input terminals Ii are low-active signals. Each of the EXCLUSIVE-OR circuits EXOR1 to EXOR9 performs the EXCLUSIVE-OR operation of two inputs. As a result of this, outputs of the EXCLUSIVE-OR circuits EXOR1 to EXOR9 make a transition from L-level to H-level in response to the inputting of active signals to the input terminals Ii.

Outputs of the AND gates AND1 to AND9 are supplied to an OR circuit OR1. The OR circuit OR1 is configured to perform the OR operation of the outputs of the AND gates AND1 to AND9 and to supply the outputs to the oscillation control section 36 as oscillation stop canceling signals. That is, the oscillation stop canceling section 35 is configured to output high-active oscillation stop canceling signals which make a transition from L-level to H-level in response to the inputting of active signals to any of the input terminals I1 to I9.

In this embodiment, the MCU 28 is configured to write and update oscillation enabling signals ENi, which indicate whether or not the input terminals I1 to I9 are used, in the enabling control storage section 42 by monitoring the inputs to the input terminals I1 to I9. Also, the MCU 28 is configured to write and update polarity control signals INVi in the polarity control storage section 41, based upon whether the input signals inputted to the input terminals I1 to I9 are high-active signals or low-active signals.

Incidentally, when the signals inputted to the input terminals I1 to I9 are power key signals and inputs by remote control, these signals become active at a polarity suited to the system and, therefore, the polarity control signals corresponding to these signals may be of a fixed level suited to the system.

On the other hand, the cables which supply the 5 volts of DDC may sometimes be inserted into the terminal T9 or extracted therefrom irrespective of whether the MCU 28 is in operation or out of operation, and the supply of the 5 volts of DDC may sometimes cease while the MCU 28 is out of operation. On the other hand, it is necessary that MCU 28 operate when these cables are inserted or extracted. For example, it is necessary for the MCU 28 to operate in order to detect the correspondence of the source equipment connected to cables with the terminal each time the cables are inserted and extracted.

However, when a polarity control signal corresponding to the 5 volts of DDC is always a signal of L-level, what can be detected is limited to that the level of the 5 volts of DDC has changed from L-level to H-level, more specifically, that the 5 volts of DDC have been transmitted via cables. Hence, in this embodiment, immediately before the MCU 28 stops its operation, the MCU 28 updates the polarity control signals INVi to be stored in the polarity storage section 41, depending on whether or not the 5 volts of DDC is supplied via the cables connected to the input terminals Ii.

That is, the MCU 28 is configured to cause polarity control signals to obtain H-level immediately before stopping its operation in a case where the MCU 28 stops its operation during the supply of the 5 volts of DDC and to cause polarity control signals to obtain L-level immediately before stopping its operation in other cases.

The clock oscillator 29 performs the oscillation or the stop of the oscillation of an EDID system clock on the basis of an oscillation control signal. The EDID system clock from the clock oscillator 29 is supplied to an oscillation stable circuit 37. The oscillation stable circuit 37 supplies the clock from the clock oscillator 29 to the MCU 28 and determines whether or not an EDID system clock is oscillated stably on the basis of the data from the MCU 28. When the oscillation of an EDID system clock from the clock oscillator 29 has become stable, the oscillation stable circuit 37 is configured to supply this EDID system clock to the EDID block 12.

The oscillation stable circuit 37 has a delay function of not supplying an EDID system clock to the EDID block immediately after the start of the oscillation until the oscillation becomes stable. As a result of this, at the start of the oscillation, an instable system clock at a restart is prevented from being supplied to the EDID block 12, whereby it is possible to prevent each circuit of the EDID block 12 from malfunctioning.

As described above, for an EDID system clock from the clock oscillator 29, the restart of the oscillation is controlled on the basis of results of the detection of the 5 volts of DDC of the four channels. That is, when the MCU 28 has judged that the operation of the MCU 28 itself is unnecessary, the MCU 28 outputs an oscillation stop signal and causes the oscillation of the oscillation control section 36 to be stopped. As a result of this, power consumption is suppressed by stopping the MCU 28. On the other hand, when source equipment has been connected and the 5 volts of DDC has been transmitted, the oscillation of an EDID system clock is restarted and the operation of the MCU 28 is restarted.

The I/O control section 27 outputs the inputted 5 volts of DDC to the control section 20 via the selector 25. The selector 25 selects the 5 volts of DDC of the channel based on a channel selection signal from the EDID memory section 21, and outputs the 5 volts of DDC to the control section 20.

The control section 20 outputs a hot plug signal as described above. On the basis of a channel selection signal from the EDID memory section 21, the switch 24 selects a hot plug signal of a selected channel and outputs the hot plug signal to an I/O control section 26. The I/O control section 26, which is controlled by the EDID memory section 21, outputs the hot plug signal from a terminal T8 to corresponding source equipment via a corresponding channel.

The MCU 28 is configured to be able to control the writing of each piece of EDID information into the EDID memory section 21 via an internal bus 34. Although FIG. 1 shows an example in which EDID information is written by use of the internal bus 34, it is also possible to perform writing by using other interfaces such as an I$^2$C bus. Note that, when the EDID memory section 21 is composed of an SRAM, the EDID memory section 21 is initialized by the MCU 28 each time power supply voltage is supplied to the EDID block 12.

Furthermore, the MCU 28 may be configured to control the selector 25 by transmitting a channel selection signal via an I$^2$C bus which is not shown in the figure. Also, the MCU 28 may be configured to control the switch 24 by transmitting a channel selection signal via an I$^2$C bus which is not shown in the figure. Also, the MCU 28 may output a hot plug signal regardless of the hot plug signal outputted from the control section 20.

In this embodiment, a switch 13 for HDMI input is provided. The switch 13 is configured to select one of the TMDS signals of two inputs and to supply the TMDS signal to the physical layer section 14C. The MCU 28 is configured to supply a control signal to the switch 13 via a terminal T10 and to control the selection of the switch 13. It is possible to accept inputs whose number is larger than the number of inputs to the data authentication block by selecting inputted TMDS signals by use of the externally provided switch 13.

Figures 3A, 3B, 3C, 4A, 4B:
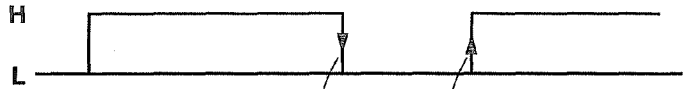
FIGS. 3A to 3C are timing charts to explain the operation of the embodiment.
FIGS. 4A and 4B are explanatory diagrams to explain the operation of the embodiment.

Next, the operation of this embodiment thus configured will be described with reference to the timing charts of FIGS. 3A to 3C and the explanatory diagrams of FIGS. 4A and 4B. FIG. 3A shows the 5 volts of DDC supplied to the input terminal of the oscillation stop canceling section 35, FIG. 3B shows the operating condition of the MCU 28, and FIG. 3C shows the writing in the polarity control storage section 41. Note that, "Operate" in FIG. 3B indicates the condition in which the MCU 28 is in operation, and "Stop" indicates the condition in which the MCU 28 is out of operation. FIGS. 4A and 4B each show an example of the storage contents of the polarity control signal storage section 41 and the enabling control storage section 42 corresponding to the output ports 1 to 9.

Now it is assumed that in a display device in which the semiconductor integrated circuit device 10 of FIG. 1 is incorporated, an image from source equipment connected to an HDMI port is displayed. It is assumed that the power supply of the source equipment connected to the HDMI port is turned on. By turning on the main power supply of the display device, the switch 32 also is turned on and the power supply voltage from the power supply circuit 31 is supplied to the data authentication block 11. The power supply voltage of the power supply circuit 33 is also supplied to the EDID block 12 and other circuit portions.

With the main power supply on, the oscillation control section 36 causes the clock oscillator 29 to generate a data authentication system clock and an EDID system clock. As a result of this, the MCU 28, the data authentication block 11 and the EDID block 12 start their operations.

The control section 20 generates a hot plug signal, which provides the information that HDMI connection is possible, and supplies outputs to the corresponding source equipment via the switch 24 and the I/O control section 26. According to the request from the source equipment for reading the EDID information inputted via the I$^2$C buses of the channels A to D, the EDID receivers 22A to 22D read the EDID information stored in the EDID memory section 21 and output the EDID information in the corresponding source equipment. As a result of this, the source equipment acquires the information on the receiver equipment and inter-equipment authentication is performed.

The 5 volts of DDC from the equipment specified by a channel selection signal is supplied to the control section 20 via the selector 25. The HDCP authentication information from the source equipment specified by a channel selection signal is supplied to the HDCP receiver via the selector 23.

The TMDS signal from the equipment specified by a channel selection signal is converted into a digital signal by the physical layer sections 14A to 14C, thereafter selected by the selector 15, and supplied to the demultiplexer 16. The demultiplexer 16 separates video data, audio date and the like from the inputted signal, and supplies the video data, audio date and the like to the HDCP authentication section 17.

The HDCP authentication section 17, which is given HDCP authentication information from the HDCP receiver 18 and an authentication key from the key ROM 19, performs HDCP authentication. As a result of this, the encrypted data from the demultiplexer 16 is decoded, and the video data and audio data are outputted from the HDCP authentication section 17. In this manner, in the display device which is receiver equipment, it is possible to display images from the source equipment.

It is assumed here that the MCU 28 judges it unnecessary for the MCU 28 itself to operate. In this case, the MCU 28 outputs an oscillation stop signal to the oscillation control section 36. As a result of this, the oscillation control signal 36 causes the clock oscillator 29 to stop oscillation. That is, in this case, although the power supply voltage from the power supply circuit 33 is supplied to the MCU 28 and the EDID block 12, an EDID system clock from the clock oscillator 29 is not supplied. Therefore, the MCU 28 and the EDID block 12 stop their operations and power consumption is reduced.

Also in this case, power supply voltage is supplied from the power supply circuit 33 to the EDID block 12 and other circuit portions. It is assumed here that the power supply of the source equipment connected to an HDMI port is turned on and that 5 volts of DDC via any of the four channels, which are the channels A to D, is transmitted to the oscillation stop canceling section 35 of the semiconductor integrated circuit device 10.

For example, it is assumed that the 5 volts of DDC of the channel A is supplied to the oscillation stop canceling section 35. The EXCLUSIVE-OR EXOR1 of the oscillation stop canceling section 35 performs the EXCLUSIVE-OR operation of the 5 volts of DDC supplied to the input terminal I1 and of the polarity control signal stored in the polarity control storage section 41. If it is now assumed that as shown in FIGS. 4A, the polarity control signal supplied to the EXCLUSIVE-OR EXOR1 circuit has L-level, the level of the output of the EXCLUSIVE-OR circuit EXOR1 becomes H-level because of a level transition of the input terminal I1 from L-level to H-level. As a result of this, also the level of the output of the AND gate AND1 becomes H-level. The OR circuit OR1 generates an oscillation stop canceling signal which makes a transition from L-level to H-level because the output of the AND gate AND1 becomes H-level.

With this oscillation stop canceling signal, the oscillation control section 36 causes the oscillation of an EDID system clock of the clock oscillator 29 to be restarted. The clock from the clock oscillator 29 is supplied to the MCU 28 via the oscillation stable circuit 37, and the MCU 28 starts its operation. An EDID system clock from the oscillation stable circuit 37 is supplied to the EDID block 12, and the operation of the EDID block 12 is restarted.

That is, the 5 volts of DDC from the source equipment is supplied to the oscillation stop canceling section 35 via the terminal T9, whereby it is possible to restart the supply of an EDID system clock and to reboot the MCU 28. Note that, in this case, also the operation of the EDID block 12 is restarted, and this permits inter-equipment authentication between the EDID block 12 and the source equipment by the giving and receiving of EDID information.

Incidentally, it is possible that cables are removed from the source equipment while the MCU 28 is out of operation, with the result that the supply of the 5 volts of DDC is stopped. Also in this case, it is sometimes better for the MCU 28 to restart its operation. Hence, in this embodiment, at a timing immediately before stopping its operation, as shown in FIG. 3C, the MCU 28 performs the writing in the polarity storage section 41 in such a manner as to change from L-level to H-level the level of a polarity control signal corresponding to the input terminal to which the 5 volts of DDC is being supplied. As a result of this, as shown in FIG. 4B, the polarity control signals corresponding to the input terminals I1 to I4 obtain H-level.

It is assumed that cables are removed from the source equipment while the MCU 28 is out of operation, with the result that the supply of the 5 volts of DDC is stopped. For example, it is assumed that the supply of the 5 volts of DDC to the terminal I2 is stopped. Then, the level of the output of the EXCLUSIVE-OR circuit EXOR2 changes from L-level to H-level, and the level of the output of the AND gate AND2 makes a transition from L-level to H-level. As a result of this, an oscillation stop canceling signal from the OR circuit OR1 makes a transition from L-level to H-level. In this manner, the oscillation of the clock oscillator 29 is restarted, and the MCU 28 starts its operation.

It is assumed that this operation of the MCU 28 stops again as shown in FIGS. 3A to 3C. In this case, at a timing immediately before stopping its operation, as shown in FIG. 3C, the MCU 28 performs the writing in the polarity storage section 41 in such a manner as to change from H-level to L-level the level of a polarity control signal corresponding to the input terminal to which the 5 volts of DDC is possibly supplied. For example, as shown in FIG. 4A, the polarity control signals corresponding to the input terminals I1 to I4 obtain L-level.

Next, it is assumed that the supply of the 5 volts of DDC from the source equipment is restarted. For example, it is assumed that the supply of the 5 volts of DDC to the input terminal I2 is restarted. Then, level of the output of the EXCLUSIVE-OR circuit EXOR2 changes from L-level to H-level, and the level of the output of the AND gate AND2 makes a transition from L-level to H-level. As a result of this, an oscillation stop canceling signal from the OR circuit OR1 makes a transition from L-level to H-level. In this manner, the oscillation of the clock oscillator 29 is restarted, and the MCU 28 starts its operation.

That is, the oscillation stop canceling section 35 detects whether or not the supply of the 4 volts of DDC is started, and outputs an oscillation stop canceling signal to the oscillation control section 36 on the basis of the result of this detection. As a result of this, it is possible to restart the operation of the MCU 28 and the EDID block 12.

As described above, in this embodiment, it is possible to suppress the power consumption of the MCU and the EDID block by stopping a clock to the MCU and the EDID block. Also, by detecting whether or not the supply of the 5 volts of DDC is started, the generation of a system clock is restarted and the operation of the MCU and the EDID block is restarted. As a result of this, even when the EDID block and the data authentication block are incorporated in an integrated circuit, it is possible to control the stop of operation and the canceling of the stop of the MCU and the EDID block to reduce power consumption.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A semiconductor integrated circuit device comprising:
    an inter-equipment authentication section formed on a chip and configured to perform inter-equipment authentication between the inter-equipment authentication section itself and source equipment;
    a control section formed on the chip and configured to control the inter-equipment authentication section, the control section operating when a system clock from an oscillation section is supplied, and being capable of giving instructions to stop the oscillation of the oscillation section;
    an oscillation stop canceling section configured to output an oscillation stop canceling signal to restart the oscillation of the oscillation section, based upon whether or not 5 volts of DDC from the source equipment is supplied to an input terminal; and
    an oscillation control section configured to control the oscillation section on the basis of an on or off condition of a main power supply, instructions to stop the oscillation from the control section and the oscillation stop canceling signal from the oscillation stop canceling section.

2. The semiconductor integrated circuit device according to claim 1, wherein the oscillation stop canceling section detects that the 5 volts of DDC is supplied through the connection of the source equipment to the input terminal via a cable.

3. The semiconductor integrated circuit device according to claim 1, further comprising a data authentication section formed on the chip and configured to perform decoding of data from the source equipment.

4. The semiconductor integrated circuit device according to claim 3, wherein the inter-equipment authentication section is capable of inter-equipment authentication between the inter-equipment authentication section itself and multiple pieces of source equipment.

5. The semiconductor integrated circuit device according to claim 1, further comprising a power supply circuit configured to constantly supply power to the inter-equipment authentication section.

6. The semiconductor integrated circuit device according to claim 1, further comprising an oscillation stable circuit configured to prevent the supply of the system clock to the control section until the oscillation of the oscillation section becomes stable.

7. The semiconductor integrated circuit device according to claim 1, wherein the inter-equipment authentication section is capable of inter-equipment authentication between the inter-equipment authentication section itself and multiple pieces of source equipment.

8. The semiconductor integrated circuit device according to claim 1, wherein the oscillation stop canceling section is provided with a plurality of input terminals and is capable of detecting whether or not the 5 volts of DDC is supplied to each of the input terminals.

9. The semiconductor integrated circuit device according to claim 8, wherein the oscillation stop canceling section has a polarity control storage section configured to store a polarity control signal based on the active polarity of a signal supplied to the input terminal, and outputs the oscillation stop canceling signal in response to the inputting of a signal of active polarity to the input terminal.

10. The semiconductor integrated circuit device according to claim 9, wherein the oscillation stop canceling section has an enabling control storage section configured to store an oscillation enabling signal indicating whether or not the input terminal is used.

11. The semiconductor integrated circuit device according to claim 8, wherein the control section is capable of changing the polarity control signal before giving instructions to stop the oscillation to the oscillation section.

12. The semiconductor integrated circuit device according to claim 1, wherein the oscillation stop canceling section is provided with a plurality of input terminals and is capable of outputting the oscillation stop canceling signal on the basis of inputs other than the 5 volts of DDC.

13. The semiconductor integrated circuit device according to claim 12, wherein the oscillation stop canceling section has a polarity control storage section configured to store a polarity control signal based on the active polarity of a signal supplied to the input terminal, and outputs the oscillation stop canceling signal in response to the inputting of a signal of active polarity to the input terminal.

14. The semiconductor integrated circuit device according to claim 13, wherein the oscillation stop canceling section has an enabling control storage section configured to store an oscillation enabling signal indicating whether or not the input terminal is used.

15. The semiconductor integrated circuit device according to claim 12, wherein the control section is capable of changing the polarity control signal before giving instructions to stop the oscillation to the oscillation section.

16. The semiconductor integrated circuit device according to claim 1, wherein the oscillation stop canceling section has a polarity control storage section configured to store a polarity control signal based on the active polarity of a signal supplied to the input terminal, and outputs the oscillation stop canceling signal in response to the inputting of a signal of active polarity to the input terminal.

17. The semiconductor integrated circuit device according to claim 16, wherein the oscillation stop canceling section has an enabling control storage section configured to store an oscillation enabling signal indicating whether or not the input terminal is used.

18. A semiconductor integrated circuit device comprising:
    an inter-equipment authentication section formed on a chip and configured to perform inter-equipment authentication between the inter-equipment authentication section itself and source equipment;

a data authentication section formed on the chip and configured to perform decoding of data from the source equipment;
a power supply circuit configured to supply power to the data authentication section when a main power supply is on and constantly supplies power to the inter-equipment authentication section;
a control section formed on the chip and configured to control the inter-equipment authentication section, the control section operating when a system clock from an oscillation section formed on the chip is supplied, and being capable of giving instructions to stop the oscillation of the oscillation section;
an oscillation stop canceling section formed on the chip and configured to output an oscillation stop canceling signal to restart the oscillation of the oscillation section, based upon whether or not 5 volts of DDC from the source equipment is supplied to an input terminal; and
an oscillation control section configured to control the oscillation section on the basis of an on or off condition of a main power supply, instructions to stop the oscillation from the control section and the oscillation stop canceling signal from the oscillation stop canceling section.

19. The semiconductor integrated circuit device according to claim 18, wherein the oscillation stop canceling section has a polarity control storage section configured to store a polarity control signal based on the active polarity of a signal supplied to the input terminal and an enabling control storage section configured to store an oscillation enabling signal indicating whether or not the input terminal is used, and outputs the oscillation stop canceling signal in response to the inputting of a signal of active polarity to the input terminal.

20. The semiconductor integrated circuit device according to claim 19, wherein the control section is capable of changing the polarity control signal before giving instructions to stop the oscillation to the oscillation section.

* * * * *